United States Patent [19]

Mayer

[11] Patent Number: 5,235,175
[45] Date of Patent: Aug. 10, 1993

[54] ARRANGEMENT FOR DETECTING THE RADIANT ENERGY OF LIGHT-EMITTING SEMICONDUCTOR ELEMENTS AND ITS USE IN AN ELECTROPHOTOGRAPHIC PRINTER

[75] Inventor: Klaus Mayer, Munich, Fed. Rep. of Germany

[73] Assignee: Siemens Aktiengesellschaft, Munich, Fed. Rep. of Germany

[21] Appl. No.: 778,933
[22] PCT Filed: Feb. 1, 1990
[86] PCT No.: PCT/EP90/00182
   § 371 Date: Dec. 4, 1991
   § 102(e) Date: Dec. 4, 1991
[87] PCT Pub. No.: WO91/01532
   PCT Pub. Date: Feb. 7, 1991

[30] Foreign Application Priority Data

Jul. 25, 1989 [EP] European Pat. Off. ......... 89113677.2

[51] Int. Cl.$^5$ .............................................. H01J 40/14
[52] U.S. Cl. .................................. 250/208.2; 346/108
[58] Field of Search ................ 250/208.2; 346/107 R, 346/108, 154, 160

[56] References Cited

U.S. PATENT DOCUMENTS 3,988,742 10/1976 Meier et al. ..................... 346/107 R
4,435,064 3/1984 Tsukada et al. ................. 346/107 R
4,455,562 6/1984 Dolan ..................................... 346/160
4,596,995 6/1986 Yamakawa et al. ................. 346/160
4,780,731 10/1988 Creutzmann et al. .............. 346/108

FOREIGN PATENT DOCUMENTS 60-107373 6/1985 Japan.
63-264378 11/1988 Japan.
1-90774 4/1989 Japan.

Primary Examiner—David C. Nelms
Assistant Examiner—Stephone B. Allen
Attorney, Agent, or Firm—Hill, Steadman & Simpson

[57] ABSTRACT

To detect the light energy of the light-emitting elements of a character generator of an electrophotographic printer via a photoelement (FE), the light-emitting elements are activated during the measuring process in such a manner that each element emits a sequence, associated with the element, of light pulses, having the same radiant energy and a predetermined pulse frequency. The output signals of the photoelement (FE) are supplied to an active low-pass filter (V3) which forms from these a mean value which is used as a measure of the radiant energy of the light-emitting elements during the calibration process. To reduce the influence of low-frequency interference (mains voltage), a gated potential control unit is provided. The arrangement is used in an exposure energy/correction device for the optical character generator of an electrophotographic printer.

16 Claims, 3 Drawing Sheets

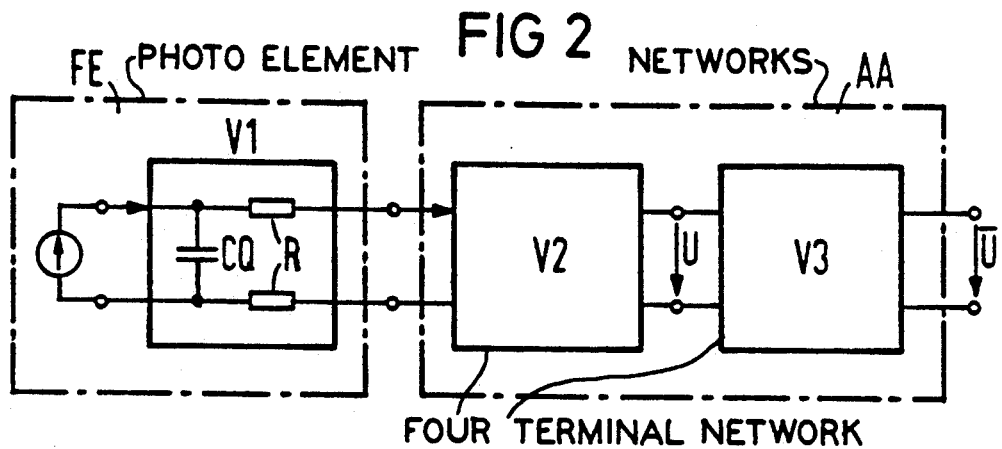
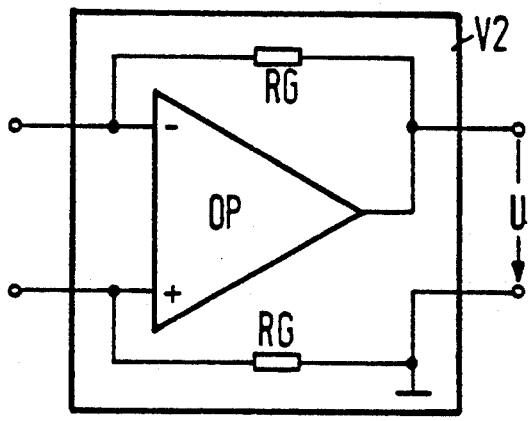
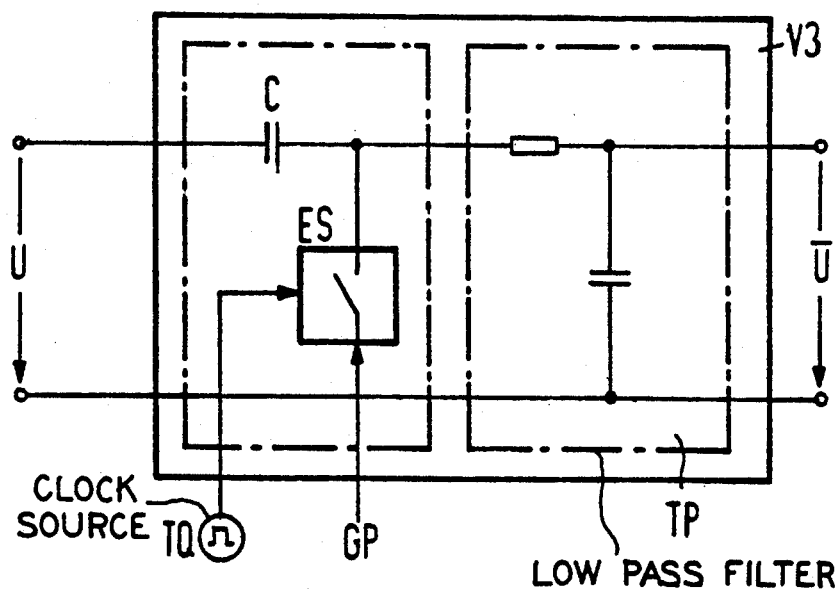

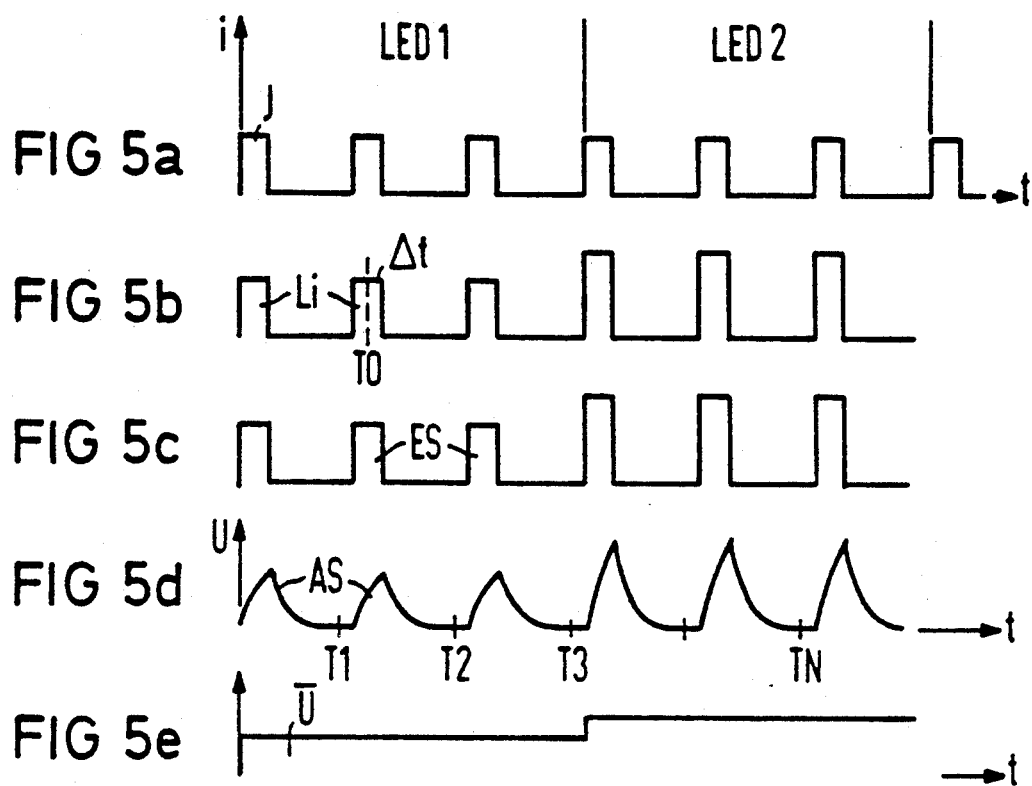
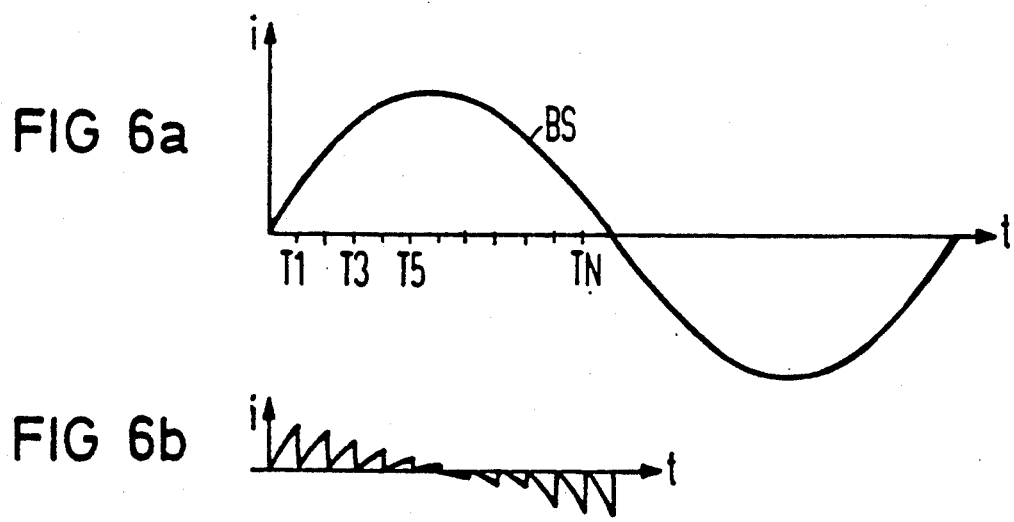

ARRANGEMENT FOR DETECTING THE RADIANT ENERGY OF LIGHT-EMITTING SEMICONDUCTOR ELEMENTS AND ITS USE IN AN ELECTROPHOTOGRAPHIC PRINTER

BACKGROUND OF THE INVENTION

In non-mechanical printers represented, for example, by electrophotographic printers, an image composed of individual dots is generated with the aid of a plurality of light elements of an optical character generator. The light elements can be, for example, light-emitting diodes which are brightly gated on by means of pulse-shaped signals of a particular frequency for generating the image. Since, in the case of a plurality of LEDs on an optical character generator, it cannot be expected that the light energy emitted by the LEDs is always the same over the operating time and from LED to LED because of the component spread and aging, it is necessary to calibrate optical character generators and during this process to measure the radiant energy, that is to say the radiant power multiplied by the duration of each individual light-emitting diode and to calibrate it in dependence on this measuring process, that is to say to adapt it with respect to the light energy. To automate this calibration, each individual LED is activated with a variable pulse-shaped signal in dependence on the desired radiant energy. In this process, the possible variations are the magnitude of the activating pulse-shaped signal and the variation of the duty ratio of the activating current, which is used with preference.

Before, for example, the duty ratio can be correctly adjusted, the emittable light energy must be determined at a predetermined duty ratio for each individual LED by means of a measuring arrangement so that the necessary variation of the duty ratio can then be carried out by means of a correction device. The light energy in each case emitted for each individual LED is measured at a constant duty ratio by means of a moving measuring arrangement in which a photoelement is conducted by means of a motor-driven slider over the strip of light-emitting diodes, that is to say over each individual LED. Such an automatic calibration arrangement for the character generator of an electrophotographic printer is known from U.S. Pat. No. 4,780,731.

The electrophotographic printer described there contains an exposure energy correction device for the optical character generator exhibiting a strip of light-emitting diodes. When a calibration routine is called up, the light-emitting elements are automatically calibrated by the fact that a photoelement detects the radiant power emitted by the light-emitting element and supplies it in the form of electrical signals to a control device coupled to the light-emitting element. The program-controlled device then allocates to each light-emitting element an individual operating time and stores this in a switching-time memory. As a result, each light-emitting element later supplies this radiant energy when operated.

To measure the radiant energy, an extremely flat photoelement component is used which, in the form of a slider, moves past each individual LED during the measuring process. Since it must be reliably encountered by the radiation of each light-emitting diode, it also has a very large area (approximately 1 cm×0.5 cm). However, very flat photoelements which, nevertheless, have a large area, have the disadvantage that, on the one hand, they only have low sensitivity and, on the other hand, have relatively large unwanted electrical capacity which makes it more difficult to measure short light flashes. In addition, the conditions can vary significantly when the photoelements are changed.

If rectangular pulses are used as light pulses, the electrical response pulses emanating from the photoelement are greatly changed.

If the radiant power or the radiant energy of light-emitting semiconductor elements such as light-emitting diodes or the like are determined by means of large-area photoelements via individual light pulses or light flashes, the results achieved are inaccurate and in some circumstances may be afflicted with interference.

SUMMARY OF THE INVENTION

It is therefore the object of the invention to develop an arrangement of the type initially mentioned in such a manner that the light power or the light energy of light-emitting semiconductor elements can be reliably detected.

It is another aim of the invention to provide an arrangement for calibrating the radiant energy of the light-emitting diodes of an optical character generator of an electrophotographic printer by means of which a reliable interference-free calibration of the optical character generator is possible.

In arrangements of the type initially mentioned, this object is achieved by an arrangement for detecting the radiant energy of light-emitting semiconductor elements by using a photoelement arranged within the area of radiation of the semiconductor elements, which receives the light emitted by the semiconductor elements and generates electrical output signals as a function of this light. The semiconductor elements to be measured are activated in such a manner that they output a sequence of light pulses of the same radiant energy and predetermined repetition rate. Means are provided which detect the output signals, associated with the respective semiconductor element, of the photoelement and form from these a mean value which is used as a measure of the radiant energy of the respective semiconductor element.

The arrangement can be used for calibrating the radiant energy of light-emitting elements of an optical character generator of an electrophotographic printer, using the photoelement which detects the light of the light-emitting elements in a measuring process required for the calibration and generates the electrical output signals as a function of this light. The light-emitting elements are activated during the measuring process in such a manner that each element emits a sequence, associated with the element, of light pulses of in each case the same radiant energy at a predetermined repetition rate. Means are provided which detect the output signals, associated with an element, of the photoelement and form from these a mean value which is used as a measure of the radiant energy of the elements during the calibration process.

The means for detecting and forming is constructed as a low-pass filter and the low-pass filter is constructed as an active low-pass filter. The low-pass filter is constructed in such a manner that it suppresses the repetition rate of the light pulses and only passes the low-frequency signal components, used as a measure of the radiant energy of the elements, of the output signals of the photoelement, produced during a continuous scanning movement of the photoelement over the light-emitting elements.

A four-terminal circuit arrangement containing a differential amplifier is provided for suppressing in-phase line interference on the signal lines.

The inputs of the differential amplifier are logically combined to first and second inputs and its output is logically combined to a first output of the four-terminal circuit arrangement. Load resistors are connected to the differential amplifier in such a manner that, referred to a reference potential present at a second output of the four-terminal circuit arrangement, the inputs of the differential amplifier exhibit the same load resistance. A first load resistor of defined magnitude is arranged between the first input and the output of the differential amplifier and a second load resistor of the same defined magnitude is arranged between the second input of the differential amplifier and the reference potential.

A gated potential control arrangement, which defines a predeterminable reference potential of the output signals, is provided for suppressing low-frequency interference in the electrical output signals.

The gating frequency of the potential control arrangement is selected in such a manner that it corresponds to the light pulse frequency or to a subharmonic of the light pulse frequency.

A reliable measurement of the radiant power or of the radiant energy is possible by means of the arrangement of electric components which detect an electrical output signal sequence generated by the photoelement in dependence on the received light pulses and form from this a time-dependent mean value which is then used as a measure of the radiant energy of the semiconductor element.

For this arrangement, it must be initially assumed that, in order to measure the radiant energy of a light pulse, not only this one light pulse is used but the semiconductor element (light-emitting diode) to be measured is made to output several light pulses of the same radiant energy in each case and with a particular predetermined pulse frequency. It is only then that the next light-emitting diode is measured.

Compared with measuring a single light pulse, a greatly increased protection against interference peaks on the measurement signal can also be expected in this manner since a single interference can be distributed over several flashes.

The signal supplied by the light sensor (photoelement) in the arrangement according to the invention is normally very small. It can therefore be falsified by so-called hum interference which is caused by the line voltage, and by various types of other low-frequency interference which impairs the measurement accuracy and thus the quality of the printed image.

In an advantageous embodiment of the invention, a gated potential control arrangement, which defines a predeterminable stable (that is to say undisturbed) reference potential of the individual signals of the output signal sequence, is therefore provided for suppressing low-frequency interference in the electrical output signal sequence.

The gating frequency of the potential control arrangement is advantageously selected in such a manner that it corresponds to the flash frequency or to a subharmonic of the flash frequency.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

FIG. 2 shows a block diagram of an arrangement for detecting the radiant energy of light-emitting diodes, FIG. 3 shows a block diagram of a current/voltage converter in an arrangement according to FIG. 2, FIG. 4 shows a block schematic of an active low-pass filter with a preceding gated potential control in an arrangement according to FIG. 2, FIGS. 5a–5e are diagrams of the signal variation within the arrangement according to FIG. 2, and FIGS. 6a–6b are diagrams of the noise-suppressing effect of the gated potential control arrangement according to FIG. 4.

DESCRIPTION OF THE PREFERRED EMBODIMENT

Figure 1:
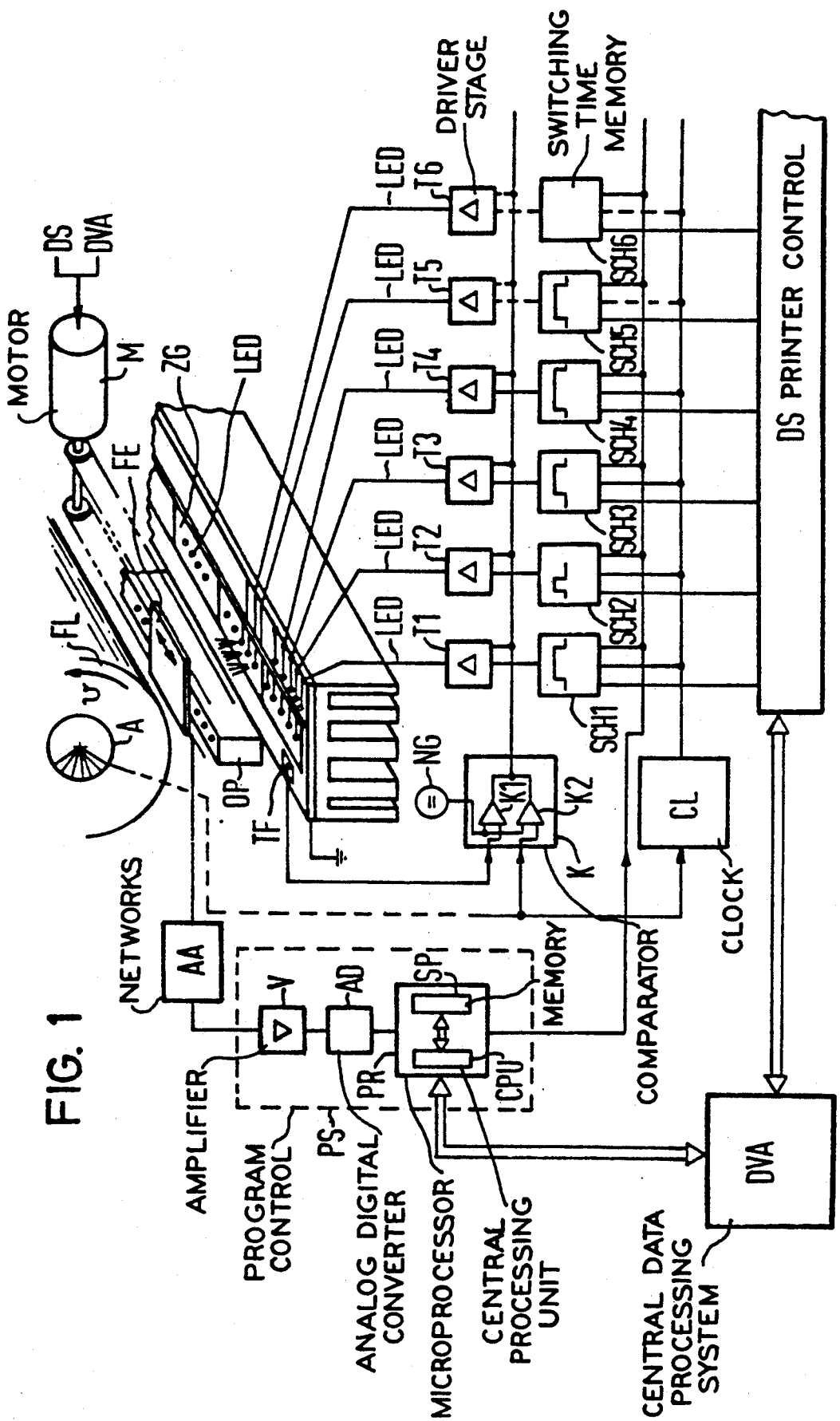
FIG. 1 shows a block schematic of an exposure energy correction device for the optical character generator of an electrophotographic printer.

The exposure energy correction device for the optical character generator of an electrophotographic printer, shown schematically in FIG. 1, is described in greater detail in U.S. Pat. No. 4,780,731 (hereby incorporated by reference).

In this arrangement, the excitation of the individual light-emitting diodes LED of a character generator ZG on a photoconductor drum FL revolving at the speed v generates by self-focusing optics OP on a photoconductor layer of the photoconductor drum FL image characters which are then developed, in a manner not shown here, in a developer station and are transferred to continuous stationary in a reprinting station. The text to be represented is supplied from a central data processing system DVA of the printer control unit DS in this arrangement.

Since the light power emitted by an LED depends not only on the electrical activating values of current and voltage but also on the component spread and the aging condition of the LED, it is necessary to correct the light power of the individual LEDs with respect to one another.

In this arrangement, the correction device contains a photoconductor element FE which is arranged in the vicinity of the surface of the photoconductor drum behind the focusing optics OP. This photoelement FE is coupled to an electric motor M which moves the photoelement FE line by line over the focusing optics OP when a calibration routine is called up, for example via the printer control unit DS or via the central data processing system DVA. At the same time, the individual light-emitting diodes LED of the character generator ZG are excited via the central printer control unit DS. The light power emanating from the individual light-emitting diodes, taking into consideration the total transmission path including the focusing optics OP, generates at the output of the photoelement FE a corresponding electrical signal which is supplied to a program-controlled device PS coupled to the photoelement FE. The program-controlled device contains an amplifier V with subsequent analog/digital converter AD for converting the analog signal corresponding to the light energy into a digital signal. A microprocessor PR contains a central processing unit ZPU with associated memory unit SP. The microprocessor PR acquires the signals corresponding to the radiant power of the LEDs via the central processing unit CPU and stores them in the memory SP in the order in which they have been scanned. From the radiant power of the individual LEDs thus measured, a standard radiant energy, which is uniform for all LEDs, can then be generated by allocating an operating time adapted to the individual radiant powers of the individual LEDs. For this purpose, the microprocessor PR allocates individual operating times per LED to the individual powers stored in the memory SP and stores these operating times in the switching-time memories SCH1 to SCHN associated with the printer control unit DS and individually connected to the LEDs. Furthermore, the correction device exhibits a compensation arrangement K which detects via corresponding sensing elements for the operating parameters of the printer device, for example speed V of the recording medium FL, operating temperature CF of the light-emitting elements LED and, depending on these, uniformly determines the standard electrical operating parameters such as voltage and current intensity for all light-emitting elements LED and supplies these to the LEDs via driver stages T1 to TN. To detect the speed V of the photoconductor drum FL, a scanning device A constructed in familiar manner is used and for detecting the temperature, a temperature sensing element TF on the carrier accommodating the LEDs is used. Both the scanner A and the temperature sensing element TF supply a voltage corresponding to the measured quantities to the compensation arrangement, which voltage is compared with an adjustable standard direct voltage NG, supplied from the outside, at the comparators K1 and K2 and, depending on this comparison process, then determines the activation current and the activation voltage for the driver stages T1 to TN. The compensation arrangement K can also be separately adjusted, for example by varying the standard direct voltage NG and independently of its operating parameters. The scanning signal proportional to the speed of rotation V, supplied by the scanner, is also supplied to a clock device CL at the same time. The central printer control unit DS activates the LEDs of the character generator ZG microline by microline in conjunction with a clock signal supplied by this clock device CL.

As stated in the introduction, the radiant energy of each individual LED is detected before the actual calibration process. For this purpose, the light-emitting diode LED1, the radiant energy of which is to be measured, is activated by means of a current pulse sequence of rectangular signals I of the current intensity i in dependence on the time t via the printer control unit DS in accordance with the representation of FIG. 5a. If a character generator ZG with approximately 11000 individual LEDs is used which are to be calibrated in a single calibration process which should be concluded within a time of approximately 30 sec, a light pulse frequency of 11.4 kHz is necessary, that is to say about 31 pulses are used for scanning one LED. This current pulse sequence I generates, in accordance with the representation of FIG. 5b, a light pulse sequence LI of individual pulses having the same radiant energy and a constant pulse repetition rate.

If a photoelement FE with ideal electrical characteristics were present, this photoelement FE would convert the light pulses LI into corresponding electrical signals ES (FIG. 5c) which could then be detected by the program control unit PS. However, the electrical output signals ES of the photoelement have a sawtooth-like variation, shown in accordance with FIG. 5d, due to the electrical characteristic of the photoelement.

If the photoelement FE is represented as a four-terminal network in accordance with FIG. 2, the photoelement has an unwanted large barrier-layer capacitance CQ which is produced by the barrier layer between the positive and negative side of the photoelement. In this connection, resistors R designate damping resistors. These are necessary for preventing an oscillation of the current/voltage converter V2 (four-terminal network 2), which follows the photoelement FE, due to the barrier-layer capacitance CQ.

The barrier-layer capacitance CQ in conjunction with other interfering influences then has the consequence that the deformed output signal AS shown in FIG. 5d is present at the output of the photoelement FE. Such output signals AS are hard to process and can be used only to a limited extent for detecting the light energy of the light pulses received by the photoelement FE.

In order to provide the possibility of optimum evaluation of the photoelement signal, nevertheless, an arrangement AA (FIG. 1) is used which is arranged between the program-controlled device PS and the photoelement FE. The arrangement AA is represented as a sequence of two four-terminal networks V2 (current-/voltage converter) and a four-terminal network V3 which is constructed as active low-pass filter. The electrical characteristic of the photoelement FE is represented as four-terminal network V1.

As already stated, the light pulses of the individual LEDs are to be detected, namely the radiant energy of an individual pulse, that is to say its radiant power multiplied by the pulse duration ($t \times J$). In this connection, the minimum pulse duration is 24 $\mu$s. Calculating the above time-constant of the four-terminal network V1, a time constant of 60 $\mu$s is obtained with a damping resistance value R of 5 kiloohms. This is distinctly more than the pulse duration. Thus, the current at the output of the four-terminal network V1 is still rising when the pulse time of an individual pulse is already at its end. No constant settled measurement signal is available.

Although it would be conceivable to scan the signal at a particular point, the full deviation of the signal, which is very small in any case, would not be used, on the one hand, because the measurement would be taken early before the final value is reached and, on the other hand, the capacitance CQ has a fairly large spread from photoelement to photoelement ($\pm 30\%$) so that the measurement signal can rise at different rates and is then at an amplitude which depends on the respective photoelement at a given scanning time. In addition, it is not possible to measure the pulse duration in this manner.

To be able to correctly measure the exposure energy of the light-emitting diode LED, the arrangement AA described in the text which follows is necessary.

It exhibits a four-terminal network V2, which consists of a current/voltage converter with an operational amplifier OP.

In the case shown, the space conditions around the photoelement FE are extremely constricted so that the evaluation electronics cannot be accommodated in the immediate vicinity. The photoelement FE is therefore connected to the evaluation electronics by means of a line which is also extremely thin because of the space conditions. In addition, this line has sufficient flexibility in order to follow the movements of the slider on which the photoelement FE is located and which must be able to move past the entire LED strip for measuring all LEDs.

The line can have a length of up to 70 cm. The current range supplied by the photoelement is between approximately 0 and 0.1 µA. A current value within this range must be converted by the evaluation electronics into a voltage $\overline{U}$ (FIG. 2) between 0 and 1 V at the output of the four-terminal network V3, the value of which must only have an error of less than ±1% from its possible maximum value. With such extreme requirements, it is appropriate to additionally suppress any interferences on the cable by special electronic measures.

In the amplifier arrangement (V2) shown in FIG. 3, two resistors RG are arranged which are identical with respect to one another. In this arrangement, the output of the operational amplifier OP is fed back to the negative input via one resistor. The positive input of the operational amplifier OP is connected to ground via a resistor RG of the same magnitude The arrangement of this resistor results in an especially noise-suppressing characteristic of the amplifier.

Interferences coupled on the two feed lines to the photoelement generally have the characteristic that they are present as a voltage having the same sign and initially the same magnitude at the two inputs since the two lines run in parallel. An operational amplifier is largely insensitive to identical voltages at its inputs, that is to say this does not create any voltage at its output. However, the noise voltages present only remain identical if they encounter the same load resistor with respect to ground. This is the one resistor RG at the negative input and it is also the resistor RG at the positive input, the values of the two resistors RG must be identical.

To evaluate the pulse voltage U of the four-terminal network V2, the four-terminal network V2 is followed by an active low-pass filter V3 having a configuration according to FIG. 4. In this arrangement, the four-terminal network V3 solves the problem of the inertia of the photoelement which is here caused by the capacitance CQ.

In this connection, it must be assumed that, in order to measure the radiant energy of a pulse, it is not only this one pulse which is used but the LED1 to be measured (FIGS. 5a-5e) is allowed to output several pulses (LI) of the same radiant energy in each case at a particular predetermined pulse frequency. It is only then that the next LED2 is measured with new light pulses of a different radiant energy, which, however, is the same for all these pulses, and a predetermined pulse frequency.

Compared with measuring a single light pulse, a greatly increased protection against noise peaks on the measurement signal can be expected in this manner since individual interferences can be distributed over several flashes.

Initially, an LED is investigated which continuously outputs light pulses without changing to a different LED. In the present case, it is assumed to output light pulses at a frequency of 11.4 kHz and, for example, as in FIG. 5, with a duty ratio of $$\frac{\Delta t}{T0} = 0.25$$

light pulses, that is to say it is switched on for 25% of the duration of the period T0 and switched off for 75%. The mean value $\overline{U}$ formed at the output of the active low-pass filter V3 is directly a measure of the radiant energy of an individual light pulse. This means that the mean value signal $\overline{U}$, formed by the arrangement AA and shown abstracted in FIG. 5e, is a direct measure of the radiant energy of a single light pulse.

In the case where switching occurs from one LED1 to the next LED2 so that finally the entire row of LEDs can be measured, the condition that light pulses are emitted by one LED whilst the one following in each case does not operate at all, that is to say emits light pulses with a radiant energy of 0 as it were, is obtained in an unfavorable case. The low-pass filter is constructed in such a manner that the mean value function $\overline{U}$ can be obtained with the fewest possible single flashes per LED. An analog/digital converter component AD (FIG. 1) can then be used for each individual LED for detecting this voltage and forwarding it digitally to the microprocessor control PR during the time in which a constant voltage $\overline{U}$ is present.

The frequency response, and thus the cut-off frequencies, of the low-pass filter will be adapted to the light pulse frequency. In this connection, active and passive low-pass filters can be used. However, an active low-pass filter is of advantage compared with a passive RC low-pass filter, shown diagrammatically in FIG. 4, which has unnecessarily severe roundings in its frequency response.

An active low-pass filter of the order n=2 has been found to be advantageous. With a higher-order low-pass filter, no improvement justified in relation to the increased expenditure (more OP chips, problems with component tolerances, development cost) can be expected since, although an ideal low-pass filter has a short settling time because it is possible to increase the cut-off frequency, it tends to have overshoot. This opinion has been confirmed by practical tests with low-pass filters of the order n=4. During the implementation of the active low-pass filter, it has been found to be most advantageous to implement a so-called Butterworth low-pass filter, to observe the settling and then to change the low-pass filter in the direction of a Bessel low-pass filter until a minimum time for reaching the settled state is reached.

Assuming a light pulse frequency of 11.4 kHz and stipulating 0.6 ms as time for evaluating the measurement value, the value of 2.7 ms is obtained as time necessary for measuring an LED in a preferred illustrative embodiment of the invention. This results in a frequency of the mean value of the sensor signal of 185 Hz.

The signal supplied by the light sensor FE is normally very small. It can therefore be falsified by so-called hum interference according to the representation of FIG. 6a BS, which is caused by the mains voltage, and by various types of other low-frequency interference which impairs the measurement accuracy and thus the printed image. This interference can be quite considerably reduced by means of a gated potential control GP corresponding to that shown in FIG. 4. In this arrangement, the signal from the photoelement FE is conducted via a capacitance C and then onto the low-pass filter TP. The capacitor C is followed by an electronic switch ES which is logically combined to it and which, controlled by a clock source TQ, forces the output of the capacitor C to a particular potential, which can be arbitrarily set, at particular times, namely at times T1 to TN (FIG. 5d). This potential can also be, for example, ground potential.

The closing times of the switch ES must be selected in such a manner that they occur at the times at which the sensor signal has decayed or is at a fixed signal-independent potential. The preferred position of the switch closing point is indicated in FIG. 5d, T1 to TN. This shows that the preferred frequency of closing is equal to the light pulse frequency. If necessary, a subharmonic of the light pulse frequency can be used for the switch. FIG. 6 shows the effect of the potential control. At the times T1 to TN drawn in, the switch is closed and a particular potential is forced at the output of the capacitor C in FIG. 4. In the ideal case, the sinusoidal noise variation of FIG. 6a is then reduced to the noise signal variation of FIG. 6b. In FIG. 6b t designates time and i designates level in this connection. The effect can be demonstrated by means of a numerical example. The sinusoidal interference is assumed to have the value 2 from peak to peak. The frequency is 50 Hz. The switch closing frequency is 10,000 Hz. The remaining noise then has a magnitude of 0.062 from peak to peak. The noise is therefore reduced by a factor of 31.8.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. An arrangement for detecting radiant energy of light-emitting semiconductor elements comprising: a photoelement arranged within an area of radiation of the semiconductor elements, the photoelement receiving light emitted by the semiconductor elements and generating electrical output signals as a function of the received light, means for activating the semiconductor elements such that the semiconductor elements output a sequence of light pulses having the same radiant energy and predetermined repetition rate and means for detecting the output signals, associated with a respective semiconductor element, of the photoelement and forming from the output signals a mean value which is a measure of the radiant energy of the respective semiconductor element.

2. The arrangement as claimed in claim 1, wherein the means for detecting and forming has a low-pass filter.

3. The arrangement as claimed in claim 1, wherein the means for detecting and forming has a gated potential control arrangement, which defines a predeterminable stable reference potential of the output signals, for suppressing low-frequency interference in the electrical output signals.

4. The arrangement as claimed in claim 3, wherein the potential control arrangement has a gating frequency that is selected such that the gating frequency corresponds to one of a light pulse frequency of the repetition rate or a subharmonic of the light pulse frequency.

5. The arrangement as claimed in claim 1, wherein the means for detecting and forming has a four-terminal circuit arrangement having a differential amplifier for suppressing in-phase line interference on first and second signal lines, the photoelement having first and second terminals connected, respectively, to first and second inputs of the four-terminal circuit arrangement via the first and second signal lines, respectively.

6. The arrangement as claimed in claim 5, wherein the differential amplifier has first and second inputs logically combined to the first and second inputs of the four-terminal circuit arrangement and has an output logically combined to a first output of the four-terminal circuit arrangement and wherein the four-terminal circuit arrangement has load resistors connected to the differential amplifier such that, referred to a reference potential connected to a second output of the four-terminal circuit arrangement, the first and second inputs of the differential amplifier have the same load resistance.

7. The arrangement as claimed in claim 6, wherein a first load resistor having a defined magnitude is connected between the first input and the output of the differential amplifier and a second load resistor having the same defined magnitude is connected between the second input of the differential amplifier and the reference potential.

8. An arrangement for calibrating radiant energy of light-emitting elements of an optical character generator of an electrophotographic printer, comprising: a photoelement which detects light of the light-emitting elements in a measuring process required for calibration of the light-emitting elements and generates electrical output signals as a function of the light, the light-emitting elements being activated during the measuring process such that each element of the light-emitting elements emits a sequence, associated with the respective light-emitting element, of light pulses of the same radiant energy at a predetermined repetition rate and means for detecting the output signals, associated with a light-emitting element, of the photoelement and forming from the output signals a mean value which is a measure of the radiant energy of the light-emitting elements during the measuring process.

9. The arrangement as claimed in claim 8, wherein the means for detecting and forming has a gated potential control arrangement, which defines a predeterminable reference potential of the output signals, for suppressing low-frequency interference in the electrical output signals.

10. The arrangement as claimed in claim 9, wherein the potential control arrangement has a gating frequency that is selected such that the gating frequency corresponds to one of a light pulse frequency of the repetition rate or a subharmonic of the light pulse frequency.

11. The arrangement as claimed in claim 8, wherein the means for detecting and forming has a low-pass filter.

12. The arrangement as claimed in claim 11, wherein the low-pass filter is an active low-pass filter.

13. The arrangement as claimed in claim 11, wherein the low-pass filter has means for suppressing the repetition rate of the light pulses and only passes low-frequency signal components, that are a measure of the radiant energy of the light-emitting elements, of the output signals of the photoelement, produced during a continuous scanning movement of the photoelement over the light-emitting elements.

14. The arrangement as claimed in claim 8, wherein the means for detecting and forming has a four-terminal circuit arrangement having a differential amplifier for suppressing in-phase line interference on first and second signal lines, the photoelement having first and second terminals connected, respectively, to first and second inputs of the four-terminal circuit arrangement via the first and second signal lines, respectively.

15. The arrangement as claimed in claim 14, wherein the differential amplifier has first and second inputs logically combined to the first and second inputs of the four-terminal circuit arrangement and has an output logically combined to a first output of the four-terminal circuit arrangement and wherein the four-terminal circuit arrangement has load resistors connected to the differential amplifier such that, referred to a reference potential connected to a second output of the four-terminal circuit arrangement, the first and second inputs of the differential amplifier have the same load resistance.

16. The arrangement as claimed in claim 15, wherein a first load resistor having a defined magnitude is connected between the first input and the output of the differential amplifier and a second load resistor having the same defined magnitude is connected between the second input of the differential amplifier and the reference potential.

* * * * *